Patented Feb. 26, 1952

2,587,266

UNITED STATES PATENT OFFICE 2,587,266

WATER EMULSIFIABLE METALLIC PASTE PIGMENTS

Robert I. Wray, New Kensington, and Wayne B. Roberts, Mount Lebanon, Pa., assignors to Aluminum Company of America, Pittsburgh, Pa., a corporation of Pennsylvania No Drawing. Application August 10, 1948, Serial No. 43,551

11 Claims. (Cl. 106—290)

This invention relates in general to water-emulsifiable, paste pigment formulations, and in particular to such formulations in which the pigment portion is composed of metallic flakes. The invention is primarily concerned with water-emulsifiable, paste pigments in which aluminum flake constitutes the metallic portion of the formulations. It should not be limited to aluminum, however, since other metals and their alloys may be substituted therefor.

Metallic flake pigments are made generally by two well known processes and are available commercially in dry powder and paste forms. In the dry form, small particles of metal are subjected to disintegration under the influence of impact or hammering instrumentalities in a substantially dry condition, although a small amount of lubricant or grease, in the form of a fatty acid, or mixtures thereof, may be present during disintegration of the metal particles. A fine grade of metallic pigment results from this dry process, the degree of fineness being controllable through the amount of disintegration practiced.

In the paste process, metallic flake pigments are produced by charging metal particles into a suitable ball mill in the presence of a solution of a volatile hydrocarbon and a grease or lubricant, such as a fatty acid, or mixtures thereof, to produce a sludge or paste-like mass during all stages of disintegration of the metal particles, as a result of the grinding and hammering action of the balls on the charge in the mill. When the metal has been reduced to flake of the proper size and shape by the ball-milling operation, a portion of the liquid phase is removed, as by filtration, to provide a metallic paste cake, in the case of aluminum, having an approximate composition by weight, 70 to 85 per cent metal flakes, about 0.5 to 2.0 per cent fatty acid lubricant, and about 14.5 to 28.0 per cent volatile hydrocarbon. This paste cake is normally adjusted by admixture with a solution of clean volatile hydrocarbon and fatty acid to produce a metallic paste pigment of approximate composition by weight, 60 to 65 per cent metal flakes, about 1.0 to 3.0 per cent fatty acid lubricant, and 34 to 37 per cent volatile hydrocarbon.

The metal content of a paste pigment will vary for any given metal and in the case of metallic copper pigments, the ball mill product is filtered to provide a paste cake having an approximate composition by weight, 80 to 90 per cent metal flakes, about 0.5 to 2.0 per cent fatty acid lubricant, and about 9.5 to 18.0 per cent volatile hydrocarbon. This paste cake is normally adjusted by admixture with a solution of clean volatile hydrocarbon and fatty acid to produce a metallic paste pigment of approximate composition by weight, 75 to 85 per cent metal flakes, about 1.0 to 3.0 per cent fatty acid lubricant, and 14 to 22 per cent volatile hydrocarbon.

Metallic paste and dry powder pigments produced in accordance with the above described processes are presently employed in the manufacture of metallic paints by mixing the same in suitable proportion with a vehicle, such as varnish. Depending upon whether a leafing or non-leafing pigment is required, the fatty acid lubricant or grease employed in the production of the pigment is selected to impart the desired property in the final paint film. For example, stearic acid, palmitic acid, and mixtures thereof, are leaf producing lubricants, or agents, whereas oleic acid, ricinoleic acid, and mixtures thereof, are generally non-leafing in character. Although mineral spirits is the most widely used volatile hydrocarbon employed in the commercial production of metallic paste pigments, aromatic hydrocarbons, such as high flash naphtha, toluol, and other volatile hydrocarbons, and mixtures thereof, may be used.

We have discovered that metallic pigments, and particularly aluminum flake pigments, produced by either of the processes described above, can be employed in the manufacture of water-emulsifiable paste pigments that may be subsequently made up in paint form by the simple addition of water and a stirring or mixing operation. Paints made in this manner may be brushed or sprayed on metal, wood and paper, alike, to provide a well-bonded, continuous coating film of good metallic luster and appearance.

Since the water-emulsifiable paste pigments of the invention are metallic in nature, we have found that water mixed paints made therefrom have significant value as mold washes, in which case paint films may be applied directly to hot cast iron or steel molds without the fire hazard normally present when paints containing a major portion of mineral spirits, alcohol, kerosene, and similar well known paint thinners are used. It is also significantly characteristic of the metallic paste pigments of the invention that water mixed paints made therefrom may be applied to paper and fabric products to provide metallized surfaces thereon without the normal absorption and penetration of oil type vehicles employed with varnish type paints.

Heretofore, a variety of steps have been necessary in the preparation and manufacture of water type paints, and this is particularly so in the case of casein containing paint and paste formulations. For example, a cooking step has been employed to react casein with one or more ingredients of water paint formulations before final admixture of the ingredients with the water vehicle. Such a cooking step has added to the cost of the final product to the consumer. Several separate mixing steps have also been employed in water paint manufacture even where it has been the desire to prepare a paste pigment for subsequent admixture with water.

So far as is known to the inventors, no success has been experienced in the manufacture of a metallic base pigment, in paste form, for subsequent admixture with water to form a water paint, where the paste pigment has been characterized by its stability, non-hardening tendency, and freedom from agglomerate formation under conditions of sealed storage which exclude the atmosphere.

A primary object of the invention is to provide a stable, water-emulsifiable, metallic paste pigment that is characterized by freedom from hardening tendencies and agglomerate formation under storage conditions which exclude the atmosphere.

A further object of the invention is to provide a water-emulsifiable metallic paste pigment, specifically a metallic aluminum flake containing paste pigment, that includes casein and a water-soluble, soap-forming alkali, but which paste excludes any cooking or heat-consuming requirements or steps in its formulation and manufacture.

Another object of the invention is to provide a stable mixture of ingredients to form a metallic flake pigment that, on mixture with water and stirring, provides a water paint characterized by its metallic sheen and brilliance.

It is an object of the present invention to provide a stable, water-emulsifiable metallic pigment in paste form which is substantially free from agglomerates and any objectionable reaction in the paste during storage.

Another object is to provide a composition of matter that contains metallic pigment and which is water-miscible to produce a water-dispersible paint suitable for mold wash, as well as being decorative and capable of producing economical paint films.

A further object is to provide a metallic paste pigment composition that lends itself to the production of water-emulsifiable, metallic inks, paints and coating compositions that are substantially free from the disadvantages inherent in the use of oil type paints on paper and similar fibrous materials.

Other objects and advantages of the invention will present themselves on consideration of the following specification, specific examples, and the appended claims.

According to the practice of the present invention, it has been discovered that metallic flake particles, manufactured by either a dry or paste process, can be formulated in water-emulsifiable paste form that responds favorably to packaging and storage without developing pressure or hardening. Metallic pastes forming the compositions and products of the invention have been satisfactorily prepared from mixtures of aluminum flake, mineral spirits, or other suitable hydrocarbon, and at least one grease or lubricating fatty acid selected from the group consisting of palmitic, stearic, oleic and ricinoleic acid, by admixture with commercial tall oil, a binder, such as casein, and a water-soluble, soap-forming alkali. By "tall oil" is meant the commercial by-product from the digestion of wood pulp, which normally contains from about 40 to 55 per cent rosin acids, from about 40 to 55 per cent fatty acids, and from about 5 to 10 per cent unsaponifiable material, such as sterols, higher alcohols, hydrocarbons, and the like.

The water-soluble, soap-forming alkalis, selected from the group consisting of the carbonates of sodium, the borates of sodium, morpholine, the ethanolamines and isopropanolamines, which are capable of combining with the fatty acids and the other organic acids present on the pigment and in the tall oil, to produce effective emulsifying agents when the paste pigment formulations are mixed with water, are herein contemplated.

Although the tall oil constituent of the water-miscible paste formulations serves to some degree as a binder in water paints prepared therefrom, the presence of casein likewise effects a binding action in the final water paint films. Casein, however, exhibits a tendency to mold; as a constituent of the metallic paste formulations contemplated herein, it has been found that small amounts of an anti-mold agent, or preservative, such as the borates of sodium, and the chlorinated phenyl phenols, may be successfully employed in the paste formulations.

Further addition agents in the form of small amounts of free soap, or sodium stearate, have been found to accelerate the dispersibility of the paste pigments in water, and particularly water at room temperature, and the addition of a small amount of a water-soluble silicate, such as one of the alkali metal silicates, has been found to act as an inhibitor against the generation of gas within sealed containers of paste formulations. For this purpose we prefer to use sodium disilicate.

No attempt is made to explain the precise chemical phenomena that may take place in the water-emulsifiable paste formulations or compositions forming the basis of this invention. The theory is advanced, however, that the water-soluble, soap-forming alkalis selected from the group consisting of the carbonates of sodium, the borates of sodium, the ethanolamines, the isopropanolamines and morpholine react and/or combine with the available fatty acid or acids, and other organic acids present on the metal flakes, in solution or dispersed in the volatile hydrocarbon and associated with the tall oil, to form water-soluble soaps during the subsequent admixture of the paste pigments with water. Regardless of the exact chemistry that is involved, the water-miscible paste formulations falling within the invention are stable and free from any tendency to harden under storage conditions, which exclude atmosphere and moisture.

The water-emulsifiable paste pigment formulations of the invention are not emulsions as initially formed and are kept as free from water as commercially practicable. We have found, however, that combined water, water of crystallization and small amounts of sorbed water may be tolerated in the initial paste pigment formulations providing the teaching and practice of the invention is followed.

The following water-miscible, aluminum paste pigment formulations were made up and successfully tested in storage, and subsequent admixture with water, to produce aluminum base water paints. Each paste formulation was made to a standard formula by mixing 605 grams of metallic flakes, mineral spirits and a small amount of a fatty acid, or mixtures thereof, with 212 grams of tall oil, with or without up to 10 per cent resinous materials, such as ester gum, and 91 grams of binder such as casein, emulsifying agent or agents, and/or preservative, inhibitor and free soap, the total weight of the formulation in each case being 908 grams.

*Example I*

A water-miscible, aluminum paste pigment formulation was made in accordance with the above stated proportions by a single mixing operation, and converted to percentage composition by weight, the paste formulation comprised 52.3 per cent aluminum flake, 13.3 per cent mineral spirits, 1.0 per cent stearic acid, as determined in the initial aluminum paste cake containing mineral spirits, 23.4 per cent commercial tall oil, 6.36 per cent casein, 1.22 per cent sodium carbonate, 0.96 per cent sodium bicarbonate, 0.63 per cent borax, 0.72 per cent sodium stearate, or soap, and 0.11 per cent sodium silicate. The paste formulation exhibited good stability after several months storage in sealed containers, retaining its original paste consistency without any evidence of hardening, and was free from agglomerates. When mixed with water at room temperature, as well as with hot water, in amounts of 6 grams of paste to 25 c. c. water, the paste readily emulsified and dispersed in the water to form a free flowing water paint that was brushed on paper and metal panels with good results. The dried paint films exhibited characteristic metallic aluminum gloss, sheen and reflectivity.

*Example II*

A similarly prepared paste pigment comprising 52.3 per cent aluminum flake, 13.3 per cent mineral spirits, 1.0 per cent stearic acid associated with the mineral spirits and metal flake, 6.60 per cent casein, 23.4 per cent commercial tall oil, 2.65 per cent sodium carbonate, 0.60 per cent anhydrous sodium tetraborate, 0.05 per cent sodium disilicate and 0.10 per cent sodium stearate gave similar results on storage and when mixed with water to provide a water paint. The water paint made from this paste had the further advantage of exhibiting greater resistance to rubbing than the paint made from the paste of Example I. This improved characteristic is believed to be the result of the decrease in the amount of free soap present in this paste formulation.

*Example III*

A third aluminum paste pigment formulation made in accordance with the invention comprised 52.3 per cent aluminum flake, 13.3 per cent mineral spirits, 1.0 per cent stearic acid on the flake and in the mineral spirits, 23.4 per cent commercial tall oil, 6.22 per cent casein binder, 1.42 per cent sodium carbonate, 1.14 per cent sodium bicarbonate, 1.07 per cent borax, present as an anti-mold agent, 0.05 per cent sodium disilicate, and 0.1 per cent sodium stearate. The paste pigment and water paint made therefrom were identical in their characteristics to that of Example II.

*Example IV*

The paste pigment of this example of the invention, made in accordance with the standard formula given above, represents a slight variation from the previous examples in that a quantity of morpholine, one of the stated soap-forming alkalis, was included along with the other named soap-forming carbonate of sodium. The composition by weight of this specific example of the invention can be expressed as 52.3 per cent aluminum flake, 13.3 per cent mineral spirits, 1.0 per cent stearic acid on the flakes and in the mineral spirits, 23.4 per cent commercial tall oil, 6.49 per cent casein binder, 0.99 per cent sodium carbonate, 0.19 per cent anhydrous sodium tetraborate, 0.03 per cent sodium silicate, and 2.30 per cent morpholine. The paste pigment exhibited good stability and the water paint made therefrom was similar to the paints of the previous examples. The morpholine, which has replaced a large portion of the sodium carbonate, served as a full equivalent therefor.

*Example V*

This example was prepared under the general formula expressed in the previous examples and its composition by weight was 52.3 per cent aluminum flake, 13.3 per cent mineral spirits, 1.0 per cent stearic acid on the flakes and in the mineral spirits, 23.4 per cent commercial tall oil, 6.85 per cent casein binder, 3.00 per cent anhydrous sodium tetraborate, 0.05 per cent sodium silicate, and 0.10 per cent sodium stearate or soap. The paste retained its consistency on sealed storage and was readily emulsified in hot and cold water to form a water type paint.

*Example VI*

A paste formulation similar to Example V but substituting triethanolamine in equal amount for the anhydrous sodium tetraborate was water-emulsifiable in hot water at 140° F. with the same results as stated for the previous examples.

*Example VII*

This example was also made up in the same proportions and ingredients employed for Example V with the exception that the water-soluble, soap-forming alkalis triethanolamine and morpholine were both present in equal amounts of 1.50 per cent of the total weight of the paste pigment. This paste formulation was emulsifiable in water at 140° F. and was quite similar to the previous examples.

*Example VIII*

A paste formulation having the approximate composition by weight, 52.3 per cent aluminum flake, 13.3 per cent mineral spirits, 1.0 per cent mixture of stearic and palmitic acids on the flakes and in the mineral spirits, 23.4 per cent commercial tall oil, 6.85 per cent casein, 3.00 per cent mixture of isopropanolamines, 0.05 per cent sodium silicate, and 0.10 per cent sodium stearate was prepared by simple mixing of the various ingredients. The paste pigment was emulsifiable in water at 140° F. by stirring the paste into the hot water. Brush outs of the paint exhibited good metallic gloss and reflectivity.

*Example IX*

This example of a water-miscible paste formulation falling within the concept of the invention was made from an initial aluminum flake paste cake which was produced used a non-leafing type lubricant, specifically oleic acid. The composition by weight of this paste was 52.1 per cent aluminum flake, 14.0 per cent mineral spirits, 0.5 per cent oleic acid associated with the flakes and mineral spirits, 7.06 per cent casein, 2.14 per cent sodium carbonate, 0.65 per cent borax, 0.05 per cent sodium silicate, 0.10 per cent soap, 21.0 per cent tall oil and 2.4 per cent ester gum. The paste formulation retained its consistency and remained stable on storage in sealed containers. Water paint made therefrom brushed out satisfactorily producing a typical metallic aluminum surface.

*Example X*

A water-emulsifiable, copper paste pigment formulation was made in accordance with the invention by a simple mixing operation to a composition by weight, 54.0 per cent copper flake, 10.60 per cent mineral spirits, 2.0 per cent stearic acid, as determined in the initial copper paste cake containing mineral spirits, 23.4 per cent commercial tall oil, 6.36 per cent casein, 1.25 per cent sodium carbonate, 1.00 per cent sodium bicarbonate, 0.67 per cent borax, and 0.72 per cent sodium stearate, or soap. The paste pigment dispersed readily in water at 140° F. in amounts of 12 grams of paste to 25 c. c. water to form a free flowing water paint that brushed on paper and steel panels with good results to produce dried paint films exhibiting characteristic metallic copper coatings.

The specific examples given above are merely for purposes of illustration and are not to be taken as limiting the scope of the invention. The specific amounts of the ingredients in the paste formulations may be varied within wide limits and a commercial range for the various ingredients which has been found economical, but not limiting, can be stated in terms of mixtures having the approximate compositions by weight, 40 to 78 per cent metallic flake cake, or paste, containing 5.0 to 20.0 per cent mineral spirits, or equivalent volatile hydrocarbon, and 0.25 to 3.0 per cent of at least one available fatty acid from the group stearic, palmitic, oleic and ricinoleic acids; in admixture with casein between 4.5 and 8.5 per cent, 0.5 to 7.00 per cent of at least one of the water-soluble, soap-forming alkalis selected from the group, carbonates of sodium, borates of sodium, the isopropanolamines, the ethanolamines and morpholine, up to 0.5 per cent, and preferably 0.01 to 0.5 per cent, of at least one water-soluble silicate, up to 1.25 per cent, and preferably 0.5 to 1.25 per cent, sodium stearate or soap, with the balance substantially tall oil, with up to 10.0 per cent of its weight resinous oil or material, such as ester gum.

The tall oil, and/or ester gum content of the paste pigment formulations of the invention, is preferably present between 15 and 45 per cent of the total weight of the metallic paste pigment formulation.

Variations in the amounts of the several ingredients and any particular selection of the equivalents in a specific paste formulation, will have a bearing upon whether hot or cold water should be employed in the final water paint mixture. In any case, it is preferred to employ hot or warm water to hasten the mixing time in any particular instance.

Commercial tall oil has been referred to and employed in all the examples, with the exception of Example IX, in which case 10.0 per cent by weight of the tall oil has been replaced by ester gum, as the major portion of the liquid phase of the metallic paste pigment formulations of this invention. By the term, the "balance substantially tall oil," wherever used, is meant commercial tall oil with additions of other compatible resinous oils.

What is claimed is:

1. A water-emulsifiable, aluminum paste pigment comprising a mixture of 40 to 78 per cent metal flake, volatile hydrocarbon, and at least one available fatty acid selected from the group consisting of stearic, palmitic, oleic and ricinoleic acids; with 15 to 45 per cent tall oil, 4.5 to 8.5 per cent casein, and 0.5 to 7.0 per cent of at least one of the water-soluble, soap-forming alkalis selected from the group consisting of carbonates of sodium, borates of sodium, and the amines consisting of morpholine, ethanolamine and isopropanolamine, said aluminum paste pigment being characterized by its stability, paste-retaining consistency and freedom from agglomerate formation under storage conditions sealed against atmosphere.

2. A water-emulsifiable, aluminum paste pigment comprising a mixture of 40 to 78 per cent metal flake, volatile hydrocarbon, and at least one available fatty acid from the group consisting of stearic, palmitic, oleic and ricinoleic acids; with 15 to 45 per cent tall oil, 4.5 to 8.5 per cent casein, 0.5 to 7.0 per cent of at least one of the water-soluble, soap-forming alkalis from the group consisting of carbonates of sodium, borates of sodium, and the amines consisting of morpholine, ethanolamine and isopropanolamine, and an inhibitor in the form of a water-soluble silicate, said aluminum paste pigment being characterized by its stability, paste-retaining consistency and freedom from agglomerate formation under storage conditions sealed against atmosphere.

3. A water-emulsifiable, aluminum paste pigment comprising a mixture of 40 to 78 per cent aluminum flake, mineral spirits, and at least one available fatty acid selected from the group consisting of stearic, palmitic, oleic and ricinoleic acids; with 15 to 45 per cent tall oil, 4.5 to 8.5 per cent casein, 0.5 to 7.0 per cent of at least one of the water-soluble, soap-forming alkalis selected from the group consisting of carbonates of sodium, borates of sodium, and the amines consisting of morpholine, ethanolamine and isopropanolamine, and sodium stearate up to 1.25 per cent, said aluminum paste pigment being characterized by its stability, paste-retaining consistency and freedom from agglomerate formation under storage conditions sealed against atmosphere.

4. A water-emulsifiable, aluminum paste pigment comprising a mixture of 40 to 78 per cent aluminum flake, mineral spirits, and at least one available fatty acid selected from the group consisting of stearic, palmitic, oleic and ricinoleic acids; with 15 to 45 per cent tall oil, 4.5 to 8.5 per cent casein, 0.5 to 7.0 per cent of at least one of the water-soluble, soap-forming alkalis selected from the group consisting of carbonates of sodium, borates of sodium, and the amines consisting of morpholine, ethanolamine and isopropanolamine, sodium stearate up to 1.25 per cent, and up to 0.5 per cent inhibitor in the form of a water-soluble silicate, said aluminum paste pigment being characterized by its stability, paste-retaining consistency and freedom from agglomerate formation under storage conditions sealed against atmosphere.

5. A water-emulsifiable, aluminum paste pigment comprising a mixture of 40 to 78 per cent aluminum paste cake containing mineral spirits, and at least one of the fatty acids selected from the group consisting of stearic, palmitic, oleic and ricinoleic acids; with 15 to 45 per cent tall oil, 4.5 to 8.5 per cent casein, 0.5 to 7.0 per cent of at least one of the water-soluble, soap-forming alkalis selected from the group consisting of carbonates of sodium, borates of sodium, and the amines consisting of ethanolamine, morpholine and isopropanolamine, 0.5 to 1.25 per cent sodium stearate, and 0.01 to 0.5 per cent sodium disilicate, said aluminum paste pigment being characterized by its stability, paste-retaining consistency and freedom from agglomerate formation under storage conditions sealed against atmosphere.

6. A water-emulsifiable, aluminum paste pigment comprising a mixture composed of 40 to 78 per cent aluminum paste cake containing 5.0 to 20.0 per cent mineral spirits, and 0.25 to 3.0 per cent of at least one fatty acid selected from the group consisting of stearic, palmitic, oleic and ricinoleic acids; 4.5 to 8.5 per cent casein, 0.5 to 7.0 per cent of at least one of the water-soluble, soap-forming alkalis selected from the group consisting of carbonates of sodium, borates of sodium, the ethanolamines, the isopropanolamines, and morpholine, 0.5 to 1.25 per cent sodium stearate, 0.01 to 0.5 per cent sodium disilicate, and the balance substantially tall oil.

7. A water-emulsifiable, copper paste pigment formulation comprising a mixture composed of 40 to 78 per cent copper paste cake containing 5.0 to 20.0 per cent volatile hydrocarbon, and 0.25 to 3.0 per cent of at least one fatty acid selected from the group consisting of stearic, palmitic, oleic and ricinoleic acids; 4.5 to 8.5 per cent casein, 0.5 to 7.0 per cent of at least one of the water-soluble, soap-forming alkalis selected from the group consisting of carbonates of sodium, borates of sodium, the ethanolamines, the isopropanolamines and morpholine, 0.5 to 1.25 per cent sodium stearate, and the balance substantially tall oil.

8. A water-emulsifiable, metallic paste pigment comprising a mixture of 40 to 78 per cent metal flake, volatile hydrocarbon, and at least one available fatty acid selected from the group consisting of stearic, palmitic, oleic and ricinoleic acids; with 15 to 45 per cent tall oil, 4.5 to 8.5 per cent casein, and 0.5 to 7.0 per cent of at least one of the water-soluble, soap-forming alkalis selected from the group consisting of carbonates of sodium, borates of sodium, and the amines consisting of morpholine, ethanolamine and isopropanolamine, said metallic paste pigment being characterized by its stability, paste-retaining consistency and freedom from agglomerate formation under storage conditions sealed against atmosphere.

9. A water-emulsifiable, aluminum paste pigment comprising 52.3 per cent aluminum flake, 13.3 per cent mineral spirits, 1.0 per cent stearic acid, 23.4 per cent tall oil, 6.36 per cent casein, 1.22 per cent sodium carbonate, 0.96 per cent sodium bicarbonate, 0.63 per cent borax, 0.72 per cent sodium stearate, and 0.11 per cent sodium silicate, said aluminum paste pigment being characterized by its stability, paste-retaining consistency and freedom from agglomerate formation under storage conditions sealed against atmosphere.

10. A water-emulsifiable, aluminum paste pigment formulation comprising 52.3 per cent alumimum flake, 13.3 per cent mineral spirits, 1.0 per cent stearic acid, 6.60 per cent casein, 23.4 per cent tall oil, 2.65 per cent sodium carbonate, 0.60 per cent anhydrous sodium tetraborate, 0.05 per cent sodium disilicate, and 0.10 per cent sodium stearate, said aluminum paste pigment formulation being characterized by its stability, paste-retaining consistency and freedom from agglomerate formation under storage conditions sealed against atmosphere.

11. A water-emusifiable, aluminum paste pigment formulation comprising 40 to 78 per cent aluminum flake, 5.0 to 20.0 per cent mineral spirits, 0.25 to 3.0 per cent stearic acid, 15.0 to 45.0 per cent tall oil, 4.5 to 8.5 per cent casein, 0.5 to 7.0 per cent sodium bicarbonate, 0.5 to 7.0 per cent borax, 0.01 to 0.5 per cent water-soluble silicate, and 0.5 to 1.25 per cent sodium stearate, said aluminum paste pigment formulation being characterized by its stability, paste-retaining consistency and freedom from agglomerate formation under storage conditions sealed against atmosphere.

ROBERT I. WRAY.
WAYNE B. ROBERTS.

REFERENCES CITED

The following references are of record in the file of this patent:

UNITED STATES PATENTS

| Number | Name | Date |
|---|---|---|
| 2,002,891 | Hall | May 28, 1935 |
| 2,355,889 | O'Roughlin | Aug. 15, 1944 |
| 2,362,884 | Clark | Nov. 14, 1944 |
| 2,401,666 | Schmidt | June 4, 1946 |
| 2,450,072 | Zavaleta | Sept. 28, 1948 |